United States Patent
Klang et al.

(10) Patent No.: US 9,820,113 B2
(45) Date of Patent: Nov. 14, 2017

(54) MESSAGE TRANSMISSION FOR VEHICLE-TO-VEHICLE COMMUNICATION ENABLED DEVICES

(71) Applicant: Telefonaktiebolaget L M Ericsson (publ), Stockholm (SE)

(72) Inventors: Göran N. Klang, Enskede (SE); Robert Baldemair, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 25 days.

(21) Appl. No.: 14/430,938

(22) PCT Filed: Sep. 25, 2012

(86) PCT No.: PCT/SE2012/051013
§ 371 (c)(1),
(2) Date: Mar. 25, 2015

(87) PCT Pub. No.: WO2014/051473
PCT Pub. Date: Apr. 3, 2014

(65) Prior Publication Data
US 2015/0264538 A1    Sep. 17, 2015

(51) Int. Cl.
*H04W 24/00*     (2009.01)
*H04W 4/12*      (2009.01)
(Continued)

(52) U.S. Cl.
CPC ............... *H04W 4/12* (2013.01); *H04L 67/12* (2013.01); *H04W 4/023* (2013.01); *H04W 4/026* (2013.01);
(Continued)

(58) Field of Classification Search
None
See application file for complete search history.

(56) References Cited

U.S. PATENT DOCUMENTS 7,382,274 B1    6/2008  Kermani et al.
7,672,678 B2 *  3/2010  Gaw ................ H04W 4/023
                                                    370/312

(Continued)

FOREIGN PATENT DOCUMENTS

JP    2008186082 A    8/2008
JP    2009239585 A    10/2009
WO    2007061573 A2   5/2007

OTHER PUBLICATIONS

Abid, H. et al., "Performance Analysis of LTE Smartphones-based Vehicle-to-Infrastructure Communication," 2012 9th International Conference on Ubiquitous Intelligence and Computing and 9th International Conference on Automatic and Trusted Computing, Sep. 4, 2012, pp. 72-78.

(Continued)

*Primary Examiner* — Shantell L Heiber
(74) *Attorney, Agent, or Firm* — Withrow & Terranova, PLLC (57) ABSTRACT

A method of transmitting a message is disclosed, wherein the method is for a vehicle-to-vehicle communication enabled device adapted to operate in accordance with a vehicle-to-vehicle communication protocol and in accordance with a cellular communication protocol for communication with a wireless communication network.
The method comprises determining a geographical position of the vehicle-to-vehicle communication enabled device and determining, based on the determined geographical position, whether at least one direction extending from the determined geographical position lacks other vehicle-to-vehicle communication enabled devices for reception of the message. If at least one direction lacks other vehicle-to-vehicle communication enabled devices for reception of the message, the method comprises transmitting a report to a network node of the wireless communication network, wherein the report indicates the message.

(Continued)

Corresponding computer program product, arrangement and communication device are also disclosed.

24 Claims, 5 Drawing Sheets

(51) Int. Cl.

| | | |
|---|---|---|
| *H04W 4/02* | (2009.01) | |
| *H04W 4/04* | (2009.01) | |
| *H04L 29/08* | (2006.01) | |
| *H04W 8/00* | (2009.01) | |
| G08G 1/16 | (2006.01) | |
| H04W 40/02 | (2009.01) | |
| H04L 12/721 | (2013.01) | |

(52) U.S. Cl.
CPC .............. *H04W 4/027* (2013.01); *H04W 4/04* (2013.01); *H04W 4/046* (2013.01); *H04W 8/005* (2013.01); *G08G 1/161* (2013.01); *H04L 45/66* (2013.01); *H04W 40/02* (2013.01)

(56) References Cited

U.S. PATENT DOCUMENTS

| | | | |
|---|---|---|---|
| 2010/0019932 A1* | 1/2010 | Goodwin | G08G 1/162 340/902 |
| 2010/0255866 A1 | 10/2010 | Radtchenko | |
| 2010/0278314 A1* | 11/2010 | Goldman | H04M 11/04 379/45 |
| 2011/0207476 A1* | 8/2011 | Qahwash | B60R 25/00 455/456.2 |
| 2015/0094064 A1 | 4/2015 | Lei et al. | |
| 2015/0326668 A1* | 11/2015 | Mader | H04W 4/12 455/404.1 |

OTHER PUBLICATIONS

Author Unknown, "Intelligent Transport Systems (ITS); Vehicular Communications; Basic Set of Applications; Definitions," Technical Report 102 638, Version 1.1.1, European Telecommunications Standards Institute, Jun. 2009, 81 pages.

Ernst, T. et al., "Motivations and Scenarios for Using Multiple Interfaces and Global Addresses," draft-ietf-monami6-multihoming-motivation-scenario-03.txt, May 3, 2008, 20 pages.

Hossain, E. et al., "Vehicular telematics over heterogeneous wireless networks: A survey," Computer Communications, vol. 33, May 3, 2010, pp. 775-793.

Khaled, Y. et al., "On the design of efficient Vehicular Applications," 2009 IEEE 69th Vehicular Technology Conference, Apr. 26-29, 2009, pp. 1-5.

Koulakezian, A. et al., "CVI: Connected Vehicle Infrastructure for ITS," 2011 IEEE 22nd International Symposium on Personal, Indoor and Mobile Radio Communications, Sep. 11, 2011, pp. 750-755.

Li, F. et al., "Routing in Vehicular Ad Hoc Networks: A Survey," IEEE Vehicular Technology Magazine, Jun. 2007, pp. 12-22.

Naumov, V. et al., "Connectivity-Aware Routing (CAR) in Vehicular Ad Hoc Networks," 26th IEEE International Conference on Computer Communications, May 1, 2007, pp. 1919-1927.

Peng, Y. et al., "A Novel Mobility Management Scheme for Integration of Vehicular Ad Hoc Networks and Fixed IP Networks," Mobile Networks and Applications, vol. 15, Sep. 2009, pp. 112-125.

Sivaraj, R. et al., "QoS-enabled Group Communication in Integrated VANET-LTE Heterogeneous Wireless Networks," 2011 IEEE 7th International Conference on Wireless and Mobile Computing, Networking and Communications (WiMob), Oct. 10, 2011, pp. 17-24.

Taleb, T. et al., "Design Guidelines for a Network Architecture Integrating VANET with 3G & Beyond Networks," 2010 IEEE Global Telecommunications Conference, Dec. 6, 2010, pp. 1-5.

International Search Report and Written Opinion for PCT/SE2012/051013, dated Jan. 8, 2013, 16 pages.

Bilstrup, Katrin, et al., "On the Ability of the 802.11p MAC Method and STDMA to Support Real-Time Vehicle-to-Vehicle Communication," EURASIP Journal on Wireless Communications and Networking, vol. 2009, Article ID 902414, Jan. 2009, Hindawi Publishing Corporation, 13 pages.

Uzcátegui, Roberto A., et al., "WAVE: A Tutorial," IEEE Communications Magazine, vol. 47, Issue 5, May 2009, IEEE, pp. 126-133.

International Preliminary Report on Patentability for International Patent Application No. PCT/SE2012/051013, dated Mar. 31, 2015, 8 pages.

Papadimitratos, Panos, et al., "Vehicular Communication Systems: Enabling Technologies, Applications, and Future Outlook on Intelligent Transportation," IEEE Communications Magazine, vol. 47, Issue 11, Nov. 2009, IEEE, pp. 84-95.

Wang, Lucas, et al., "Data Naming in Vehicle-to-Vehicle Communications," IEEE Conference on Computer Communications Workshops (INFOCOM WKSHPS), Mar. 25-30, 2012, Orlando, Florida, IEEE, 6 pages.

Zhu, Kun, et al., "Mobility and Handoff Management in Vehicular Networks: A Survey," Wireless Communications and Mobile Computing, vol. 11, Issue 4, Apr. 2011, John Wiley & Sons, Ltd., pp. 1-20.

\* cited by examiner

MESSAGE TRANSMISSION FOR VEHICLE-TO-VEHICLE COMMUNICATION ENABLED DEVICES

This application is a 35 U.S.C. §371 national phase filing of International Application No. PCT/SE2012/051013, filed Sep. 25, 2012, the disclosure of which is incorporated herein by reference in its entirety.

TECHNICAL FIELD

The present invention relates generally to the field of vehicle-to-vehicle communication enabled devices. More particularly, it relates to message transmission for such devices.

BACKGROUND

The concept of Intelligent Transport Systems (ITS) is an effort to integrate information and communication technology into transportation systems and vehicles with the goal to improve traffic safety and transportation efficiency.

To achieve this goal, ITS may utilize a variety of technologies including (among others) car navigation, traffic signal control systems, container management systems, variable message signs, automatic number plate recognition and speed cameras. Additionally, one or more wireless technologies may be applied, e.g. car-mounted RADAR systems, cellular technology, e.g. to establish Internet connectivity required by several ITS technologies, and direct vehicle-to-vehicle (V2V) communication.

Some references to ITS and V2V communication include Papadimitratos, et al., "Vehicular Communications Systems", IEEE Communications Magazine, November 2009; R. Uzcátegui, G. Acosta-Marum, "WAVE: A Tutorial", IEEE Communications Magazine, May 2009; and ETSI TR 102 638, "Intelligent Transport Systems (ITS); Vehicular Communications; Basic Set of Applications; Definitions", available at http://www.etsi.org/deliver/etsi_tr/102600_102699/102638/01.01.01_60/.

Several traffic safety related applications rely on V2V communication. Data related to such applications is typically only of local interest. Examples of traffic safety applications that rely on direct V2V communications include, but are not limited to, Emergency Electronic Brake Lights, Slow Vehicle Warning, Intersection Collision Warning, Hazardous Location Warning, Pre-Crash Sensing, Lane Change Warning, Cooperative Forward Collision Warning, and Emergency Vehicle Assistance.

In the Emergency Electronic Brake Light system, a car that performs a hard brake communicates this to surrounding cars which can trigger a warning to the driver to increase the driver's attention.

Cars equipped with Slow Vehicle Warning systems communicate a warning to other cars in slow speed and/or stop scenarios which in turn may trigger a warning to the driver of the receiving car.

Intersection Collision Warning systems can rely on RADAR technology. However, such implementations have the disadvantage that, in e.g. urban areas, potential colliding cars may become visible very late—often too late. In Intersection Collision Warning systems that rely on V2V communication, cars typically broadcast their position and speed periodically, and receiving cars can calculate potential collision risks and warn their respective driver if there is a collision risk. The required relative positioning accuracy for Intersection Collision Warning systems is typically very high, such as 0.5 meters.

A vehicle equipped with a Hazardous Location Warning system typically broadcasts the position of a hazardous spot. Other vehicles receiving this information may use it to warn their driver if the vehicle is approaching this position. Furthermore, a vehicle receiving the hazardous spot broadcast may repeat the broadcast to spread the information within a certain geographical area.

A Pre-Crash Sensing system may be triggered if an accident becomes unavoidable. The Pre-Crash Sensing system typically prepares the vehicle to mitigate the impact of the crash, e.g. by tightening seat belts. Crash mitigation is typically improved with information from the other vehicles that will possibly be involved in the crash. Such information may be exchanged via V2V communication.

The Lane Change Warning system typically provides information about vehicles in other lanes and assists the driver when changing lanes. For example, the vehicle intending to change a lane may broadcast this information to other traffic participants.

Vehicles moving closely together may co-operate with each other in the Cooperative Forward Collision Warning system to avoid longitudinal collisions. The required positioning accuracy may typically be 1 meter or even more accurate.

In the Emergency Vehicle Assistance system emergency vehicles may broadcast their presence, possibly including other information such as their lane, to other traffic participants to clear an emergency corridor.

These and various other ITS components may, for example, use one or more of broadcast, geocast, and unicast techniques to communicate the relevant information. There is typically a latency requirement, e.g. 100 ms or 50 ms, for transmission of the information. For example, there may be a requirement that the neighboring vehicles should receive the information within the time specified by the latency requirement, or that all vehicles within a target area of the message should receive the information within the time specified.

The traffic safety applications typically also have rather stringent positioning accuracy requirements. For some scenarios, Global Navigation Satellite Systems (GNSS) position systems such as Global Positioning System (GPS) may need to be replaced or supplemented by additional positioning solutions to achieve the required accuracy. Such additional positioning systems may, for example, be based on location information of a cellular network, and/or relative positioning between vehicles, see e.g. N. Patwari et al., "Locating the Nodes—Cooperative localization in wireless sensor networks", IEEE Signal Processing Magazine, July 2005.

V2V communication may be based on known or future device-to-device (D2D) communication techniques.

One existing technique that is suitable for V2V applications is the IEEE standard 802.11p, based on the PHY and MAC layer of 802.11, i.e. OFDM and CSMA, respectively. Data broadcasts of IEEE 802.11p include information related to the position of the source, e.g. a vehicle. OFDM and CSMA refer to Orthogonal Frequency Division Multiplex and Carrier Sensing Multiple Access respectively.

Some references to ITS and V2V communication include K. Bilstrup, et al., "On the ability of the 802.11p MAC method and STDMA to support real-time vehicle-to-vehicle communication," in EURASIP Journal on Wireless Communications and Networking, vol. 2009, Article ID 902414. STDMA refers to Self-Organizing Time Domain Multiple Access.

Thus, several traffic safety related applications rely on direct communication between vehicles, i.e. V2V communication. In order to guarantee that a message (broadcast or otherwise transmitted in a V2V communication scenario by a V2V enabled vehicle) is provided as intended to all vehicles in a desired coverage area it is important that other V2V enabled vehicles are in the vicinity of the transmitting vehicle to receive the transmission and to retransmit it, e.g. by broadcasting the message. This process should be repeated until the message has been transmitted in the entire desired coverage area.

Thus, it is important that V2V enabled devices are within reach of other V2V enabled devices to create an unbroken transmission mesh within the entire desired coverage area. If the density of vehicles capable of V2V communication is too low, messages may not be communicated as intended. For example, a message indicating traffic danger may not be delivered to a vehicle that should have benefited from the information therein. A low density of vehicle-to-vehicle communication capable vehicles is especially likely in the initial phase of introducing vehicular-to-vehicular communication. However, scenarios of low V2V enabled vehicle density may be seen also when full deployment is reached. For example, there may be a traffic situation where the distance to a neighboring vehicle is too large for V2V communication, even though it is desired to transmit an ITS message in that direction.

Therefore, there is a need for improved message transmission for vehicle-to-vehicle communication enabled devices.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide improved message transmission methods and devices for vehicle-to-vehicle communication enabled devices.

According to a first aspect, this is achieved by a method of transmitting a message for a vehicle-to-vehicle communication enabled device. The vehicle-to-vehicle communication enabled device is adapted to operate in accordance with a vehicle-to-vehicle communication protocol, and is also adapted to operate in accordance with a cellular communication protocol for communication with a wireless communication network.

The method comprises determining a geographical position of the vehicle-to-vehicle communication enabled device and determining, based on the determined geographical position, whether at least one direction extending from the determined geographical position lacks other vehicle-to-vehicle communication enabled devices for reception of the message.

The method also comprises transmitting a report to a network node of the wireless communication network, if at least one direction lacks other vehicle-to-vehicle communication enabled devices for reception of the message. The report indicates the message to the network node.

The determined geographical position may, for example, be two-dimensional or three-dimensional (e.g. longitude, latitude, and altitude).

The vehicle-to-vehicle communication enabled device may be a first vehicle-to-vehicle communication enabled device. The other vehicle-to-vehicle communication enabled devices for reception of the message may be defined as devices that are not the first vehicle-to-vehicle communication enabled device. Furthermore, the other devices may be comprised in a target area of the message.

That a direction lacks other vehicle-to-vehicle communication enabled devices for reception of the message may be interpreted as there are no other devices within reach of the first device, i.e. within reach for direct V2V communication with the first device.

A device for reception of the message is typically, but not necessarily, also a device for re-transmission of the message, e.g. has a relaying function.

According to some embodiments, a direction may be defined as a sector circumscribed by two radii and an arc, wherein a vertex between the two radii is located at the determined geographical position. Put differently, a direction may be defined as a sector having a sector angle and a radius length, wherein a vertex of the sector is located at the determined geographical position.

Typically, a vector through the determined geographical position and splitting the sector angle in two equal parts is used as notation of the direction.

According to some embodiments, a direction may be defined as a rectangle having a first side length and a second side length and wherein a midpoint of a side having the first side length is located at the determined geographical position.

Typically, a vector through the determined geographical position and parallel with the sides having the second side length is used as notation of the direction.

In some embodiments, the method may further comprise determining one or more directions for transmission of the message. In these embodiments, said determining whether at least one direction lacks other vehicle-to-vehicle communication enabled devices for reception of the message may be determined among the determined one or more directions for transmission of the message.

The one or more directions for transmission of the message may comprise an entire area, e.g. a circle having a circle radius, around the vehicle-to-vehicle communication enabled device or around the geographical position of the vehicle-to-vehicle communication enabled device.

The one or more directions for transmission of the message may alternatively comprise only directions having a road connection according to map information available to the vehicle-to-vehicle communication enabled device.

The road connection notation may comprise any relevant path where another vehicle-to-vehicle communication enabled device may travel. A road connection may be a road or a number of connected roads. According to some embodiments, the road connection terminology may also comprise paths other than conventional roads, e.g. parking lots, biking paths, pedestrian areas, etc. Furthermore, if a vehicle is parked in a parking lot or along the side of a road, or if a vehicle has left the road for some reason and is in the verge, it may still be relevant for message reception and re-transmission. Thus, according to some embodiments, the road connection terminology may also comprise the road side and/or the verge.

The term vehicle as used in this disclosure refer to cars, trucks, busses, etc, and may also comprise any other traffic participants such as bicycles, pedestrians, etc.

In some example embodiments, the method may comprise determining the one or more directions for transmission of the message by correlating the determined geographical position with map information and determining each of the one or more directions for transmission of the message as a direction that, according to the map information, comprises a road connection crossing the determined geographical position.

That a road connection crosses (or merges with) the determined geographical position may, in some embodiments, be interpreted as the road connection joining a road that extends through the determined geographical position. The joining of the road connection and the road may be in a vicinity of the determined geographical position. According to some embodiments, a road connection crosses the determined geographical position if it is possible to reach the determined geographical position by vehicle from the road connection by traveling a distance that is lower than a predetermined distance threshold.

In some example embodiments, the method may comprise determining all directions extending from the determined geographical position as directions for transmission of the message.

In some embodiments, the method may further comprise determining, for each of the at least one direction lacking other vehicle-to-vehicle communication enabled devices for reception of the message, whether the direction is a direction for transmission of the message by the vehicle-to-vehicle communication enabled device.

This determination may comprise correlating the direction with map information, and determining that the direction is a direction for transmission of the message if, according to the map information, the direction comprises a road connection crossing the determined geographical position.

The determination whether a direction lacks other vehicle-to-vehicle communication enabled devices for reception of the message may be based on respective geographical positions of other vehicle-to-vehicle communication enabled devices.

In some embodiments, the method may further comprise monitoring signaling comprising respective geographical positions of one or more other vehicle-to-vehicle communication enabled devices. For these embodiments, determining whether at least one direction lacks other vehicle-to-vehicle communication enabled devices for reception of the message may be further based on the monitored signaling.

In yet some embodiments, the method may further comprise receiving signaling comprising the respective geographical position of at least one of the one or more other vehicle-to-vehicle communication enabled devices. For these embodiments, determining whether at least one direction lacks other vehicle-to-vehicle communication enabled devices for reception of the message may be further based on the received geographical positions.

A direction may be defined as lacking other vehicle-to-vehicle communication enabled devices for reception of the message if there are no other vehicle-to-vehicle communication enabled devices in the area defining the direction.

In some embodiments, it may be determined that a direction lacks other vehicle-to-vehicle communication enabled devices for reception of the message if there are no received geographical positions in that direction extending from the determined geographical position.

A direction may also be defined as lacking other vehicle-to-vehicle communication enabled devices for reception of the message even if there are other vehicle-to-vehicle communication enabled devices in the area defining the direction. For example if, according to map information available to the vehicle-to-vehicle enabled device, none of the other vehicle-to-vehicle communication enabled devices in the area defining the direction is on a road connection that crosses the determined geographical position the direction may be defined as lacking other vehicle-to-vehicle communication enabled devices for reception of the message.

In some embodiments, determining whether at least one direction lacks other vehicle-to-vehicle communication enabled devices for reception of the message may comprise correlating the determined and received geographical positions with map information and determining that a direction lacks other vehicle-to-vehicle communication enabled devices for reception of the message if that direction does not comprise at least one of the received geographical position which, according to the map information, is on a road connection crossing the determined geographical position.

In some embodiments, the vehicle-to-vehicle communication enabled device does not have any map information available to it. In these and other embodiments, the method of the vehicle-to-vehicle communication enabled device may comprise determining the geographical position of the vehicle-to-vehicle communication enabled device and determining, without using map information and based on the determined geographical position and possibly on received geographical positions of other vehicle-to-vehicle communication enabled devices, an initial indication regarding whether at least one direction lacks other vehicle-to-vehicle communication enabled devices for reception of the message.

If at least one direction lacks other vehicle-to-vehicle communication enabled devices for reception of the message, the vehicle-to-vehicle communication enabled device may transmit the report indicating the message, and in some embodiments also the geographical positions, to the network node of the wireless communication network.

The network node may then transmit the message to enable that the message reaches all relevant vehicle-to-vehicle communication enabled devices. Transmission of the message by the network (and/or the network node) may, for example, be by unicast, e.g. if the network (and/or the network node) is aware of vehicles in the area, or by multicast/broadcast.

Transmission of the message by the network node may be to relevant vehicle-to-vehicle communication enabled devices. Relevant vehicle-to-vehicle communication enabled devices may, for example, comprise all such devices within a target area for the message, all such devices within reach of a the network node, all such devices that are out-of-reach for relayed (via other devices) V2V communication with the reporting (i.e. first) device, all such devices that are out-of-reach for direct communication with the reporting device or all such devices in the directions lacking other vehicle-to-vehicle devices.

The network node may perform a further evaluation based on map information available to the network node.

For example, the network node may determine the one or more directions for transmission of the message by correlating the determined geographical position with map information and determining each of the one or more directions extending from the determined geographical position for transmission of the message as a direction that, according to the map information, comprises a road connection crossing the determined geographical position.

If these determined one or more directions for transmission of the message do not comprise any of the at least one directions that lack other vehicle-to-vehicle communication enabled devices, the network node may determine that cellular transmission of the message is not necessary.

If these determined one or more directions for transmission of the message comprise any of the at least one directions that lack other vehicle-to-vehicle communication enabled devices, the network node may determine that cellular transmission of the message is necessary.

Furthermore, the network node may perform a further evaluation regarding whether at least one direction lacks other vehicle-to-vehicle communication enabled devices for reception of the message. For example, the network node may determine whether at least one direction lacks other vehicle-to-vehicle communication enabled devices for reception of the message by correlating the determined and received geographical positions with map information and determining that a direction lacks other vehicle-to-vehicle communication enabled devices for reception of the message if that direction does not comprise at least one of the received geographical positions which, according to the map information, is on a road connection crossing the determined geographical position.

If there is at least one direction that lacks other vehicle-to-vehicle communication enabled devices according to the further evaluation, the network node may determine that cellular transmission of the message is necessary.

If there are no directions that lack other vehicle-to-vehicle communication enabled devices according to the further evaluation, the network node may determine that cellular transmission of the message is not necessary.

The geographical positions may comprise at least one of a satellite based position indication, a cellular network location indication, and a cooperative localization position indication.

The method may further comprise transmitting the message using vehicle-to-vehicle communication according to some embodiments, for example, in at least one direction having other vehicle-to-vehicle communication enabled devices for reception of the message.

In some embodiments, the report may further comprise an indication of one or more of: the at least one direction lacking other vehicle-to-vehicle communication enabled devices for reception of the message, the determined one or more directions for transmission of the message, the determined geographical position, and the received geographical positions.

The report may be formed as a single message or as several associated messages.

Examples of suitable vehicle-to-vehicle communication protocols comprise IEEE 802.11p, IEEE 1609.1, IEEE 1609.2, IEEE 1609.3, IEEE 1609.4.

A second aspect is a computer program product comprising a computer readable medium, having thereon a computer program comprising program instructions. The computer program is loadable into a data-processing unit and adapted to cause execution of the method according to the first aspect when the computer program is run by the data-processing unit.

A third aspect is an arrangement for a vehicle-to-vehicle communication enabled device. The vehicle-to-vehicle communication enabled device is adapted to operate in accordance with a vehicle-to-vehicle communication protocol, and is also adapted to operate in accordance with a cellular communication protocol for communication with a wireless communication network.

The arrangement comprises a positioning unit, a direction evaluator and a transmitter. The positioning unit is adapted to determine a geographical position of the vehicle-to-vehicle communication enabled device. The direction evaluator is adapted to determine, based on the determined geographical position, whether at least one direction extending from the determined geographical position lacks other vehicle-to-vehicle communication enabled devices for reception of the message. The transmitter is adapted to—if at least one direction lacks other vehicle-to-vehicle communication enabled devices for reception of the message— transmit a report to a network node of the wireless communication network, wherein the report indicates the message.

The transmitter may be further adapted to transmit the message using vehicle-to-vehicle communication, i.e. to transmit the message in communication with other vehicle-to-vehicle communication enabled devices.

In some embodiments the arrangement may further comprise a determiner adapted to determine one or more directions for transmission of the message by the vehicle-to-vehicle communication enabled device. The direction evaluator may be adapted to determine whether at least one direction among the determined one or more directions lacks other vehicle-to-vehicle communication enabled devices for reception of the message.

The determiner may be adapted to determine the one or more directions for transmission of the message by correlating the determined geographical position with map information and by determining each of the one or more directions for transmission of the message as a direction that, according to the map information, comprises a road connection crossing the determined geographical position.

In some embodiments, the arrangement may further comprise a receiver adapted to monitor and receive signaling comprising respective geographical positions of one or more other vehicle-to-vehicle communication enabled devices. The direction evaluator may be adapted to further base the determination whether at least one direction lacks other vehicle-to-vehicle communication enabled devices for reception of the message on the monitored signaling and/or on the received geographical positions.

The direction evaluator may, according to some embodiments, be adapted to determine whether at least one direction lacks other vehicle-to-vehicle communication enabled devices for reception of the message by correlating the determined and received geographical positions with map information and by determining that a direction lacks other vehicle-to-vehicle communication enabled devices for reception of the message if that direction, according to the map information, does not comprise at least one of the received geographical positions which, according to the map information, is on a road connection crossing the determined geographical position.

A fourth aspect provides a vehicle-to-vehicle communication enabled communication device comprising the arrangement according to the third aspect.

Fifth, sixth, seventh and eighth aspects relate to a cellular communication network node and corresponding method, computer program product and arrangement each having at least some of the features explained above.

In some embodiments, the third and fourth aspects may additionally have features identical with or corresponding to any of the various features as explained above for the first aspect.

An advantage of some embodiments is that a message may always, provided there is cellular network coverage, be transmitted in an entire desired coverage area even in scenarios of low V2V enabled vehicle density.

Another advantage of some embodiments is that the cellular network is only used if V2V communication is not possible. Thus, there is no unnecessary loading of the cellular network, herein also denoted wireless communication network.

Yet another advantage of some embodiments is that the V2V enabled vehicle density is only evaluated in directions of interest, which further reduces unnecessary loading of the cellular network.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where V2V data may be transmitted, e.g. broadcast, with assistance from a cellular communication network.

If the density of V2V communication capable vehicles is too low there might be areas where a vehicle may broadcast a V2V message but there are no vehicle-to-vehicle communication enabled devices, hereinafter also denoted V2V enabled devices, that can re-broadcast the message. Thus, the message may get stuck in the transmission chain and may not reach the desired geographical area.

This is solved by some embodiments by evaluating whether or not the message may be adequately spread in the desired geographical area. If not, the cellular network is used as a backup for spreading the message in the desired geographical area.

The term vehicle as used in this disclosure refer to cars, trucks, busses, etc, and may also comprise any other traffic participants such as bicycles, pedestrians, etc.

According to some embodiments, it is ensured that a message broadcast from a vehicle is distributed in a complete target area and not only in directions that have V2V enabled devices in radio coverage. This ensures that traffic safety related messages reach the whole target area instead of running the risk that the message is not delivered throughout the target area because some direction(s) lack V2V enabled devices to bridge the gap to the next vehicle.

Figure 1A:
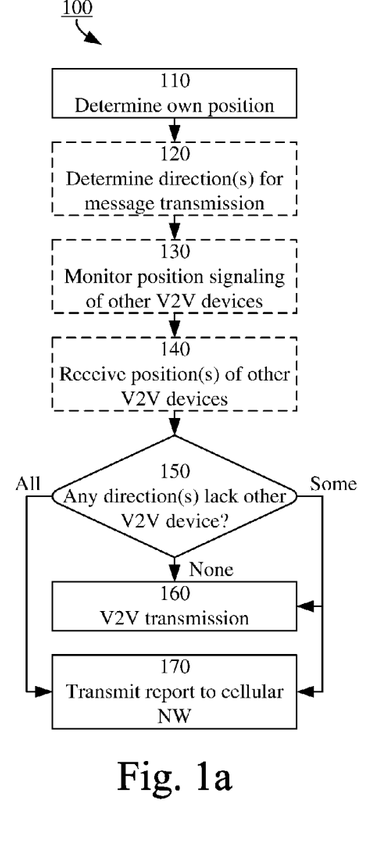
FIGS. 1a and 1b are flowcharts illustrating example method steps according to some embodiments.

FIG. 1a is a flowchart illustrating an example method 100 that provides the above solution according to some embodiments. The method 100 may typically be performed by a vehicle-to-vehicle communication enabled device.

The geographical position of the device performing the method is determined in step 110. All geographical positioning of this disclosure may utilize any (or a combination of) suitable positioning technology, for example, satellite based positioning, e.g. GNSS, GPS, cellular network location positioning, and a cooperative localization positioning, e.g. based on relative positioning between vehicles.

Optionally, it is determined (in step 120) in which directions the message is to be transmitted.

It may, for example, be desirable to transmit the message in all directions from the device. Alternatively, it may only be desirable to transmit the message in a direction where there is a road having a connection with the road where the device travels. It may even be desirable to transmit the message only in some of the directions where there is a road having a connection with the road where the device travels. For example, a Slow Vehicle Warning message may only be relevant for posterity vehicles and an Emergency Vehicle Assistance message may only be relevant for vehicles ahead of the emergency vehicle). The determination in step 120 may comprise correlation with map information according to some embodiments. The map information may be stored in the device or may be accessed at another location using any suitable means.

Signaling from potential other vehicle-to-vehicle enabled devices is optionally monitored in step 130. Such signaling typically includes respective geographical positions of the potential other devices. If there is such signaling, it is received in step 140. The determination in step 120 may be performed before, after, or in parallel to step 130 and step 140.

In step 150, it is determined whether there are any directions that lack other V2V enabled devices. The determination is based on the geographical position determined in step 110. This geographical position is the origin of the directions.

The determination in step 150 may also be based on the directions determined in step 120, on the result of the monitoring in step 130 and/or on the positions received in step 140. The evaluation in step 150 may, for example, be restricted to the directions determined in step 120. If the monitoring in step 130 shows that there are no other V2V enabled devices in the vicinity, it is determined in step 150 that there are directions lacking other V2V enabled devices. If geographical positions of one or more other V2V enabled devices are received in step 140, these positions may be used in step 150, for example as will be indicated in the following.

For each direction evaluated in step 150, it may be determined that the direction lacks other devices if there are no other devices having a geographical position located in the evaluated direction extending (or outgoing) from the transmitting device. In some embodiments, it may be determined that the direction lacks other devices even if there are other devices having a geographical position located in the evaluated direction extending from the transmitting device. For example, if there are other devices in the relevant direction, but none of them has a geographical position that coincides with a road having a connection with the road where the device travels, it may be determined that the direction lacks other devices, or in other words, that it lacks devices relevant for receiving and/or relaying the message. The determination in step 150 may comprise correlation with map information according to some embodiments. The map information may be stored in the device or may be accessed at another location using any suitable means.

If there are no directions lacking V2V enabled devices according to the evaluation in step 150 ("None"—path out of step 150), the message is only transmitted using V2V communication in step 160.

If all directions evaluated in step 150 lack V2V enabled devices ("All"—path out of step 150), the message is forwarded of indicated in a report to the cellular network in step 170. The report may also indicate the directions for transmission of the message (as determined in step 120) and/or the directions that lack V2V enabled devices (as determined in step 150).

If some directions evaluated in step 150 lack V2V enabled devices and some do not ("Some"—path out of step 150), the message is transmitted (in step 160) using V2V communication in the directions that have V2V enabled devices. Furthermore, the message is forwarded or indicated in a report to the cellular network in step 170. The report may also indicate the directions for transmission of the message (as determined in step 120) and/or the directions that lack V2V enabled devices (as determined in step 150).

After execution of step 170, the cellular network then typically transmits the message to all V2V devices in a desired area around the transmitting device. The area could be an omnidirectional area around the transmitting device or it may be an area related to the direction(s) possibly indicated in the report. The transmission of the message by the network may be by unicast, multicast or broadcast.

As mentioned before, the network node may conduct further evaluations similar to those of step 120 and/or step 150 to determine whether or not to transmit the message and in which directions.

Figure 1B:
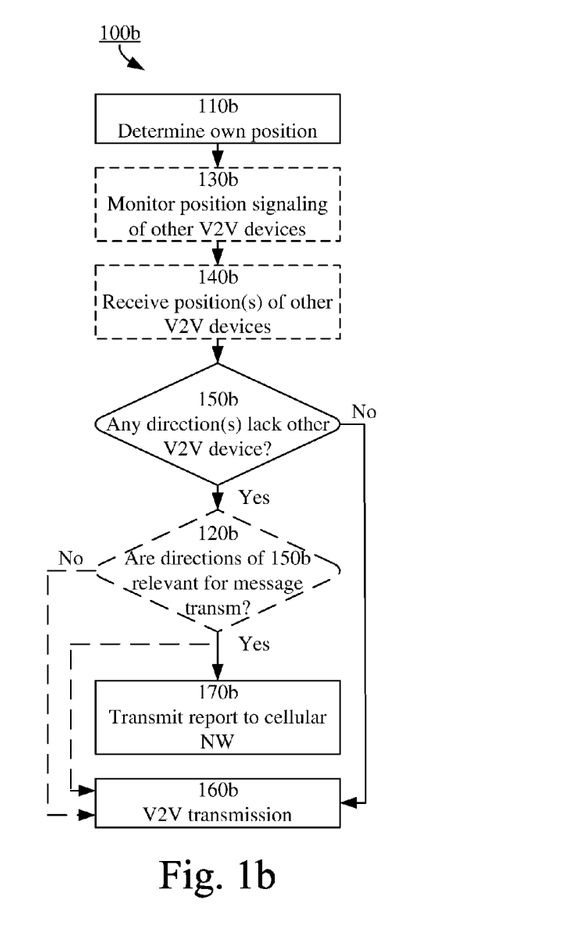

FIG. 1b is a flowchart illustrating an example method 100b that also provides the solution according to some embodiments. The method 100b may typically be performed by a vehicle-to-vehicle communication enabled device.

The geographical position of the device performing the method is determined in step 110b. Signaling from potential other vehicle-to-vehicle enabled devices is optionally monitored in step 130b. Such signaling typically includes respective geographical positions of the potential other devices. If there is such signaling, it is received in step 140b.

In step 150b, it is determined whether there are any directions that lack other V2V enabled devices. The determination is based on the geographical position determined in step 110b. This geographical position is the origin of the directions.

The determination in step 150b may also be based on the result of the monitoring of step 130b and/or on the positions received in step 140b. For example, if the monitoring of step 130b shows that there are no V2V enabled devices in the vicinity, it is determined in step 150b that there are directions lacking other V2V enabled devices. If geographical positions of one or more other V2V enabled devices are received in step 140b, these positions may be used in step 150b, for example as will be indicated in the following.

For each direction evaluated in step 150b, it may be determined that the direction lacks other devices if there are no other devices having a geographical position located in the evaluated direction extending from the transmitting device.

In some embodiments, it may be determined that the direction lacks other devices even if there are other devices having a geographical position located in the evaluated direction extending from the transmitting device. For example, if there are other devices in the relevant direction, but none of them has a geographical position that coincides with a road having a connection with the road where the device travels, it may be determined that the direction lacks other devices, or in other words, that it lacks devices relevant for receiving and/or relaying the message. The determination in step 150b may comprise correlation with map information according to some embodiments. The map information may be stored in the device or may be accessed at another location using any suitable means.

If no directions lack V2V enabled devices ("No"—path out of step 150b), the message is transmitted (in step 160b) using V2V communication.

If at least one direction lacks V2V enabled devices ("Yes"—path out of step 150b), the method continues to optional step 120b, where it is determined if it is relevant to transmit the message in these directions.

It may, for example, be desirable to transmit the message in all directions from the device. Alternatively, it may only be desirable to transmit the message in a direction where there is a road having a connection with the road where the device travels. It may even be desirable to transmit the message only in some of the directions where there is a road having a connection with the road where the device travels. The determination in step 120b may comprise correlation of the directions lacking V2V devices with map information according to some embodiments. The map information may be stored in the device or may be accessed at another location using any suitable means.

If none of the directions lacking V2V enabled devices are relevant for message transmission ("No"—path out of step 120b), the message may (if applicable, i.e. if there are any directions at all relevant for transmission of the message) only be transmitted using V2V communication in step 160b.

If one or more of the directions lacking V2V enabled devices are relevant for message transmission ("Yes"—path out of step 120b), the message is forwarded or indicated in a report to the cellular network in step 170b. The report may also indicate the directions for transmission of the message (as determined in step 120b) and/or the directions that lack V2V enabled devices (as determined in step 150b). If applicable, i.e. if there are any directions relevant for transmission of the message that have V2V enabled devices, the message may also be transmitted using V2V communication in step 160b.

After execution of step 170b, the cellular network then typically transmits the message to all V2V devices in a desired area around the transmitting device. The area could be an omnidirectional area around the transmitting device or it may be an area related to the direction(s) possibly indicated in the report.

As mentioned before, the network node may conduct further evaluations similar to those of step 120b and/or step 150b to determine whether or not to transmit the message and in which directions. For example, if step 120b is not performed by the V2V enabled device having a message to transmit, the network can do a correlation with map information to determine if the direction is relevant for transmission of the message, e.g. if there is a street along this direction or not. If the direction is relevant the network can decide to transmit the message in this direction. If the direction is not relevant, there may be no need to transmit the message in that direction.

Figure 2:
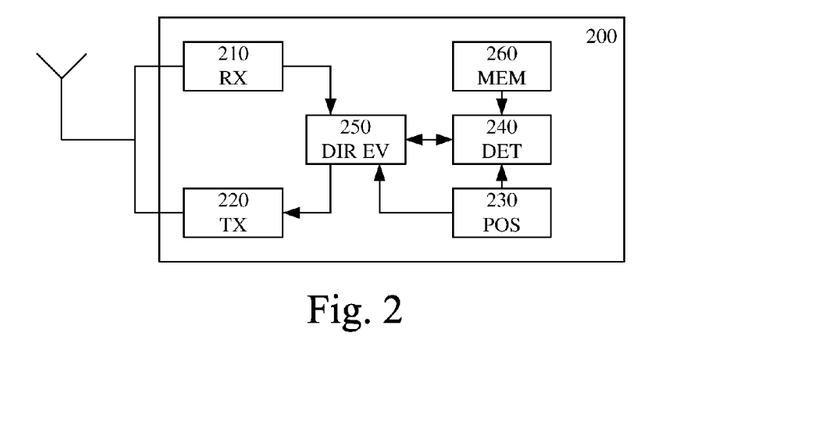
FIG. 2 is a block diagram illustrating an example arrangement according to some embodiments.

FIG. 2 is a block diagram illustrating an example arrangement 200 according to some embodiments. The arrangement may, for example, be adapted to perform any of the methods as described in relation to FIG. 1a and FIG. 1b. It may be suitable for implementation in a vehicle-to-vehicle communication enabled device adapted to operate in accordance with a vehicle-to-vehicle communication protocol, and in accordance with a cellular communication protocol for communication with a wireless communication network.

The arrangement 200 comprises a receiver (RX) 210 and a transmitter (TX) 220. It also comprises a direction evaluator (DIR EV) 250, a positioning unit (POS) 230, and—optionally—a determiner (DET) 240 and a memory (MEM) 260.

The positioning unit 230 is adapted to determine a geographical position of the vehicle-to-vehicle communication enabled device, for example as described in connection to step 110 of FIG. 1a.

The direction evaluator 250 is adapted to determine, based on the determined geographical position, whether at least one direction lacks other vehicle-to-vehicle communication enabled devices for reception (and possibly re-transmission) of the message, for example as described in connection to step 150 of FIG. 1a.

The transmitter 220 is adapted to—if at least one direction lacks other vehicle-to-vehicle communication enabled devices for reception (and possibly re-transmission) of the message—transmit a report to a network node of the wireless communication network, wherein the report indicates the message, for example as described in connection to step 170 of FIG. 1a.

The transmitter 220 may be further adapted to transmit the message using vehicle-to-vehicle communication, for example as described in connection to step 160 of FIG. 1a.

The determiner 240 is adapted to determine one or more directions for transmission of the message, for example as described in connection to step 120 of FIG. 1a. When the determiner 240 is present, the direction evaluator 250 may be adapted to determine whether at least one direction among the determined one or more directions lacks other vehicle-to-vehicle communication enabled devices for reception (and possibly re-transmission) of the message.

The receiver 210 may be adapted to monitor and receive signaling comprising respective geographical positions of one or more other vehicle-to-vehicle communication enabled devices, for example as described in connection to step 130 and step 140 respectively of FIG. 1a. When the receiver 210 is adapted to monitor and receive this signaling, the direction evaluator 250 may be adapted to further base the determination whether at least one direction lacks other vehicle-to-vehicle communication enabled devices for reception (and possibly re-transmission) of the message on the monitored signaling and/or on possible received geographical positions.

Figure 3A:
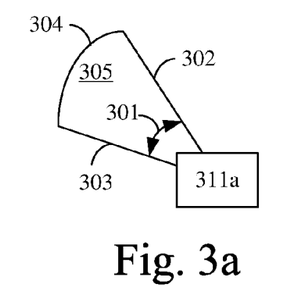
FIGS. 3a and 3b are schematic drawings illustrating example direction definitions according to some embodiments.
Figure 3B:
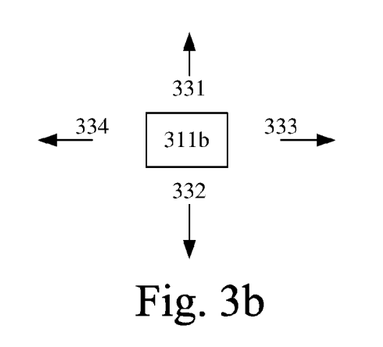

FIGS. 3A and 3B are schematic drawings illustrating example direction definitions according to some embodiments. Generally, a direction may be defined related to a geographical position and may be denoted as extending from the geographical position.

In FIG. 3A, a direction 305 from a device 311a is defined using a sector. In this definition, the sector is circumscribed by two radii 302, 303 and an arc 304, wherein a vertex between the two radii is located at the determined geographical position of the device 311a. Put differently, a direction may be defined as a sector having a sector angle 301 and a radius length, wherein a vertex of the sector is located at the determined geographical position.

Typically, a vector through the determined geographical position and splitting the sector angle in two equal parts is used as notation of the direction, which is illustrated in FIG. 3B. This Figure illustrates four directions 331, 332, 333 and 334 from a device 311b. This type of direction notation will be used throughout this disclosure for simplicity.

FIGS. 4 to 7 illustrate example vehicle-to-vehicle communication scenarios where embodiments may be applicable.

Figure 4:
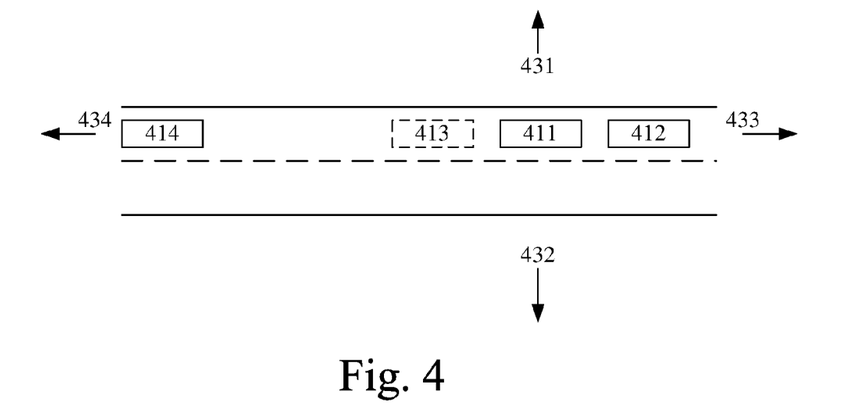
FIGS. 4 to 7 are schematic drawings illustrating example vehicle-to-vehicle communication scenarios.

FIG. 4 shows three vehicles 411, 412 and 414 with vehicle-to-vehicle communication enabled devices and a vehicle 413 which does not comprise a vehicle-to-vehicle communication enabled device. For simplicity, only vehicles with vehicle-to-vehicle communication enabled devices will be shown in the following illustrations.

If the vehicle 411 would like to transmit a message using V2V communication, it can be seen that transmission in the directions 431 and 432 will not be possible in this scenario, since no devices are present in those directions to relay (receive and possibly re-transmit) the message. However, in some situations, the directions 431 and 432 may not be so interesting for transmission of an ITS message, since there are no roads, and hence no vehicles that may benefit from the message, in these directions.

Transmission of the message in the direction 433 will be possible since there is a vehicle-to-vehicle enabled device 412 in that direction to relay the message.

Even though there are vehicles (413 and 414) in the direction 434, V2V transmission in this direction may not be possible since the neighboring vehicle 413 cannot relay the message because it is not V2V communication enabled and the vehicle 414 may be too far away for V2V communication with the vehicle 411, i.e. outside the radio coverage area of vehicle 411.

Thus, FIG. 4 illustrates a situation where the density of V2V enabled devices is too low for effective V2V transmission in all desired directions.

Embodiments of the invention solves the problem illustrated in FIG. 4 by reporting the situation to the network, that in turn may transmit the message in the direction 434 (and also in directions 431 and 432 if desirable) using cellular communication. Embodiments determine whether there are directions lacking V2V enabled devices and, if so, send the report to the network. If the device 413 was instead V2V communication enabled, the network might be contacted since the directions 431 and 432 lack V2V enabled devices. As mentioned above, such measures may cause unnecessary utilization of the network, since these directions are not really relevant for ITS messages. This problem may be overcome by first determining the directions that are relevant for transmission of a message and then only evaluate whether there are V2V enabled devices in those directions. The determination of relevant directions may, for example, be based on map information, e.g. correlating map information with the geographical position of the transmitting vehicle.

Alternatively, directions that lack V2V enabled devices may be determined first, and thereafter, it may be evaluated if these directions are relevant for transmission, e.g. by using correlation with map information as described above.

Figure 5:
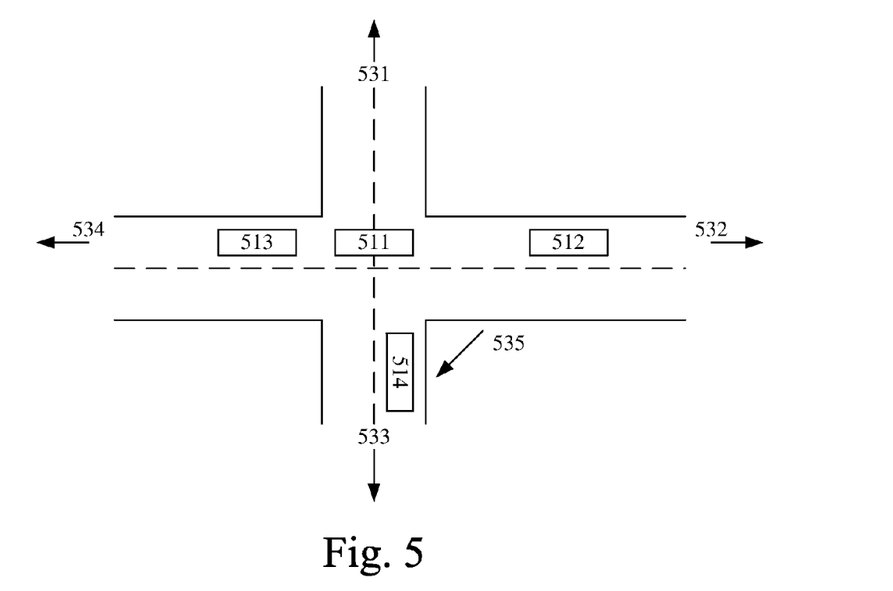

FIG. 5 shows four vehicles 511, 512, 513 and 514 with vehicle-to-vehicle communication enabled devices.

For the vehicle 511, it may be relevant to transmit ITS messages in the directions 531, 532, 533 and 534, since all these directions have roads crossing the geographical position of vehicle 511. However, it may not be possible to use V2V communication in the direction 531 since there is no V2V enabled device in that direction. Hence, the device of vehicle 511 may report this to the network and request assistance with the message transmission.

For the vehicle 512, it may be relevant to transmit ITS messages in the directions 532 and 534, since these directions have a road crossing the geographical position of vehicle 512, or in other words, the geographical position of vehicle 512 is located on a road extending in directions 532 and 534. In some scenarios, it may also be relevant for vehicle 512 to reach vehicle 514 with an ITS message, since vehicle 514 is on an intersecting road and may benefit from ITS messages from vehicle 512. Such transmission from vehicle 512 to vehicle 514 may be done by relaying the message at vehicle 511, i.e. vehicle 512 transmitting in the direction 534, and/or by direct transmission of the message, i.e. 512 transmitting also in the direction 535.

Figure 6:
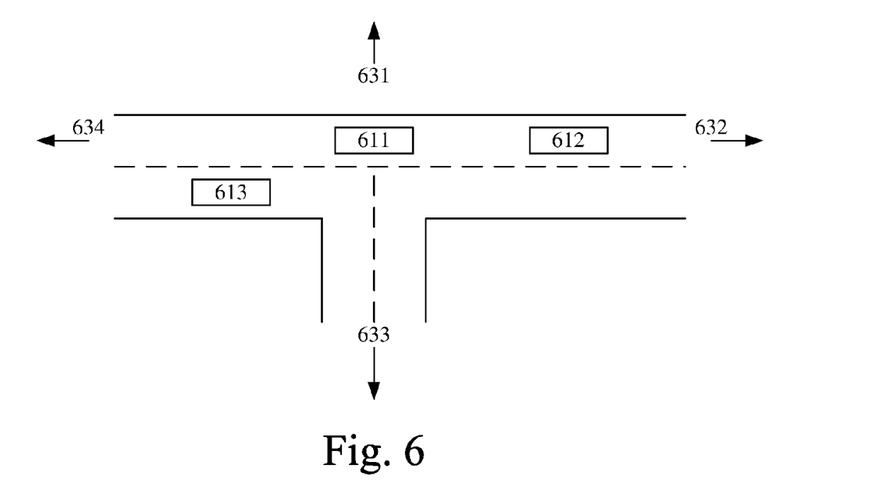

FIG. 6 shows three vehicles 611, 612 and 613 with vehicle-to-vehicle communication enabled devices.

For the vehicle 611, it may be relevant to transmit ITS messages in the directions 632, 633 and 634, since all these directions have roads crossing the geographical position of vehicle 611, or in other words, the geographical position of vehicle 611 is located on roads extending in directions 632, 633 and 634. However, it may not be possible to use V2V communication in the direction 633 since there is no V2V enabled device in that direction. Hence, the device of vehicle 611 may report this to the network and request assistance with the message transmission.

In some applications, it may not be relevant to transmit ITS messages in the direction 631, since this direction does not have any road crossing the geographical position of vehicle 611, or in other words, there is no road extending in direction 631 from the geographical position of vehicle 611. Thus, it may not even be evaluated, according to some embodiments, whether direction 631 has any V2V enabled devices.

Figure 7:
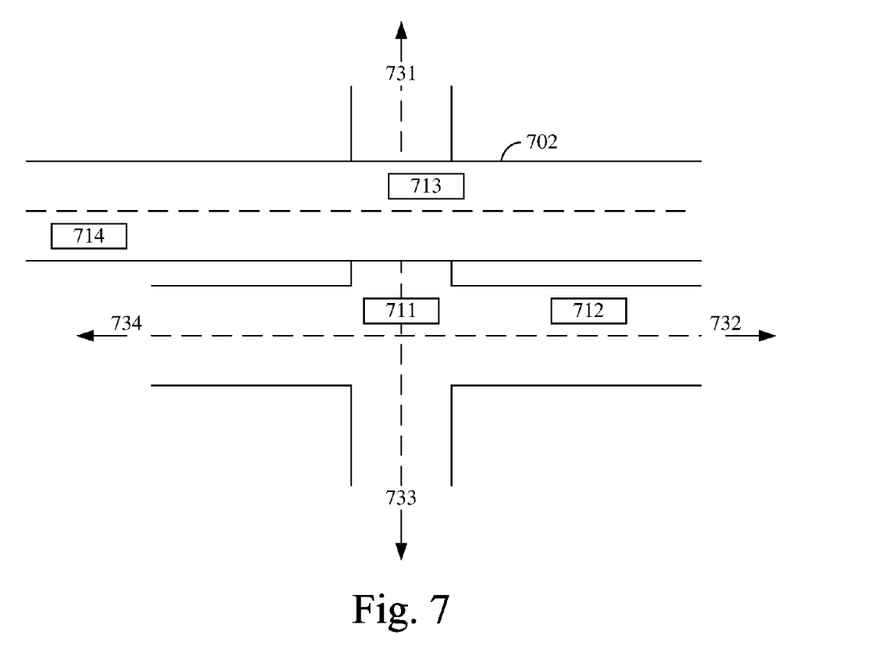

FIG. 7 shows four vehicles 711, 712, 713 and 714 with vehicle-to-vehicle communication enabled devices.

For the vehicle 711, it may be relevant to transmit ITS messages in the directions 731, 732, 733 and 734, since all these directions have roads crossing the geographical position of vehicle 711, or in other words, there are roads extending in all these directions from the geographical position of vehicle 711. However, it may not be possible to use V2V communication in the direction 733 since there are no V2V enabled devices in this direction.

Furthermore, it may not be possible, or suitable, to use V2V communication in the directions 731 and 734 since, even if these directions have V2V enables devices (713 and 714 respectively) they are on a road 702 which is disjoint with the road where vehicle 711 travels. Therefore, vehicles 713 and 714 may not benefit from the ITS messages from vehicle 711, and may not be suitable to relay the message since then the message will also start to inadequately spread on the road where vehicles 713 and 714 travel.

A disjoint road may, for example, refer to a parallel street, that does not join with the road of the transmitting device in a geographical vicinity of the V2V enabled device having a message to transmit, or a bridge.

It may be determined based on the geographical positions of 713 and 714 whether or not they are on a disjoint road compared to 711, and if so, the vehicles 713 and 714 may be excluded from the set of V2V enabled devices when 711 evaluates which directions lack devices suitable for relaying a message. Such determination may, for example, be achieved by correlating the respective geographical positions with map information.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus, such as a wireless communication device, comprising circuitry/logic for performing methods according to any of the embodiments. The electronic apparatus may, for example, be a portable or handheld mobile radio communication equipment, a mobile radio terminal, a mobile telephone, a communicator, an electronic organizer, a smartphone, a computer, a notebook, or a vehicle integrated communication equipment.

Figure 8:
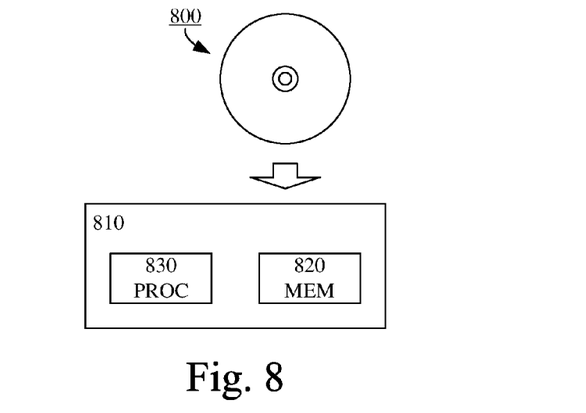
FIG. 8 is a schematic drawing illustrating a computer program product according to some embodiments.

According to some embodiments, a computer program product comprises a computer readable medium such as, for example, a diskette or a CD-ROM as illustrated in FIG. 8. The computer readable medium 800 may have stored thereon a computer program comprising program instructions. The computer program may be loadable into a data-processing unit 830, which may, for example, be comprised in a vehicle-to-vehicle communication terminal 810. When loaded into the data-processing unit, the computer program may be stored in a memory 820 associated with or integral to the data-processing unit. According to some embodiments, the computer program may, when loaded into and run by the data-processing unit, cause the data-processing unit to execute method steps according to, for example, any of the methods shown in FIG. 1a and FIG. 1b.

Figure 9:
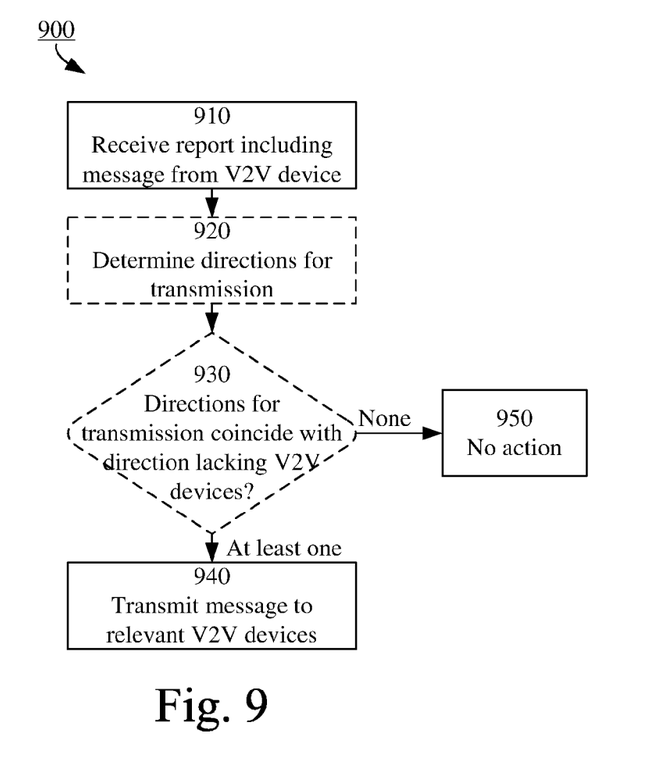
FIG. 9 is a flowchart illustrating example method steps according to some embodiments.

FIG. 9 illustrate an example method 900 that may be performed by a cellular communication network node of a wireless communication network according to some embodiments.

In step 910, a report is received from a vehicle-to-vehicle communication enabled device (compare with step 170 and step 170b of FIGS. 1a and 1b respectively). The report indicates a message to be transmitted to other vehicle-to-vehicle communication enabled devices as has been described above. The report may also indicate a determined geographical position of the reporting device, directions (extending from the reporting device) that lack other vehicle-to-vehicle communication enabled device for reception of the message and/or directions for transmission of the message.

As mentioned before, an evaluation may be performed by the network before transmission of the message by cellular communication. This is illustrated by optional steps 920 and 930.

In step 920, directions for transmission of the message are determined (compare with step 120 and step 120b of FIGS. 1a and 1b respectively). The directions for transmission may be determined by correlating the determined geographical position with map information and determining each of the one or more directions for transmission of the message as a direction that, according to the map information, comprise a road connection crossing the determined geographical position.

In step 930, it is determined whether at least one of the determined (by the reporting device and/or by the network node in step 920) directions for transmission coincides with at least one direction that lack other vehicle-to-vehicle communication enabled devices for reception of the message.

If there is no overlap between the determined directions for transmission and the directions that lack other vehicleto-vehicle communication enabled devices ("None"—path out from step 930), the network node may choose to not transmit the message as illustrated by step 950.

If there is overlap between the determined directions for transmission and the directions that lack other vehicle-to-vehicle communication enabled devices ("At least-one"—path out from step 930), the network node transmits the message as illustrated by step 940. The message is transmitted to relevant vehicle-to-vehicle communication enabled devices as has been exemplified earlier.

As an alternative, the network node may always transmit the message without the evaluation of step 920 and step 930.

Figure 10:
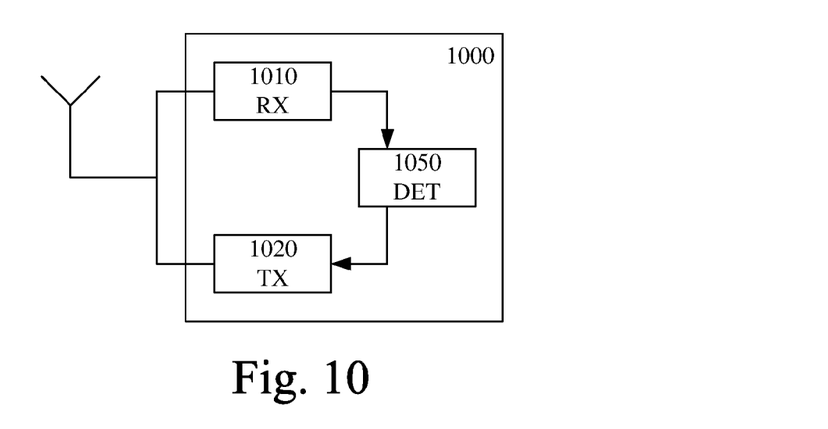
FIG. 10 is a block diagram illustrating an example arrangement according to some embodiments.

FIG. 10 illustrates an example arrangement 1000, that may be comprised in, for example, a cellular communication network node of a wireless communication network. The example arrangement 1000 may be adapted to perform, for example, the method 900 of FIG. 9.

The arrangement 1000 comprises a receiver 1010, a transmitter 1020 and a determiner 1050. The receiver is adapted to receive a report from a vehicle-to-vehicle communication enabled device as exemplified above. The transmitter is adapted to transmit the message of the report to relevant vehicle-to-vehicle communication enabled devices. The optional determiner may be adapted to perform an evaluation of whether or not to transmit the message, for example, according to step 920 and step 930 of FIG. 9.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method of transmitting a message for a vehicle-to-vehicle communication enabled device adapted to operate in accordance with a vehicle-to-vehicle communication protocol, and in accordance with a cellular communication protocol for communication with a wireless communication network, the method comprising:
   determining a geographical position of the vehicle-to-vehicle communication enabled device;
   determining, based on the determined geographical position, whether at least one direction extending from the determined geographical position lacks other vehicle-to-vehicle communication enabled devices for reception of the message; and
   if the at least one direction lacks other vehicle-to-vehicle communication enabled devices for reception of the message:
      transmitting a report to a network node of the wireless communication network, wherein the report indicates the message.

2. The method of claim 1 further comprising determining one or more directions for transmission of the message by the vehicle-to-vehicle communication enabled device, and wherein said determining whether the at least one direction lacks other vehicle-to-vehicle communication enabled devices for reception of the message is determined among the determined one or more directions for transmission of the message.

3. The method of claim 2 wherein determining the one or more directions for transmission of the message comprises:
   correlating the determined geographical position with map information; and
   determining each of the one or more directions for transmission of the message as a direction that, according to the map information, comprises a road connection crossing the determined geographical position.

4. The method of claim 2 wherein determining the one or more directions for transmission of the message comprises determining all directions extending from the determined geographical position as directions for transmission of the message.

5. The method of claim 1 further comprising determining, for each of the at least one direction lacking other vehicle-to-vehicle communication enabled devices for reception of the message, whether the direction is a direction for transmission of the message by the vehicle-to-vehicle communication enabled device.

6. The method of claim 5 wherein determining whether the direction is a direction for transmission of the message comprises:
   correlating the direction with map information; and
   determining that the direction is a direction for transmission of the message if, according to the map information, the direction comprises a road connection crossing the determined geographical position.

7. The method of claim 1 further comprising:
   monitoring signaling comprising respective geographical positions of one or more other vehicle-to-vehicle communication enabled devices; and
   wherein determining whether the at least one direction lacks other vehicle-to-vehicle communication enabled devices for reception of the message is further based on the monitored signaling.

8. The method of claim 7 further comprising:
   receiving signaling comprising the respective geographical position of at least one of the one or more other vehicle-to-vehicle communication enabled devices; and
   wherein determining whether the at least one direction lacks other vehicle-to-vehicle communication enabled devices for reception of the message is further based on the received geographical positions.

9. The method of claim 8 wherein it is determined that a direction lacks other vehicle-to-vehicle communication enabled devices for reception of the message if there are no received geographical positions in that direction extending from the determined geographical position.

10. The method of claim 8 wherein determining whether the at least one direction lacks other vehicle-to-vehicle communication enabled devices for reception of the message comprises:

correlating the determined and received geographical positions with map information; and wherein it is determined that a direction lacks other vehicle-to-vehicle communication enabled devices for reception of the message if that direction does not comprise at least one of the received geographical position which, according to the map information, is on a road connection crossing the determined geographical position.

11. The method of claim 1, wherein the geographical positions comprise at least one of a satellite based position indication, a cellular network location indication, and a cooperative localization position indication.

12. The method of claim 1 further comprising transmitting the message using vehicle-to-vehicle communication.

13. The method of claim 12, wherein the message is transmitted using vehicle-to-vehicle communication in at least one direction having other vehicle-to-vehicle communication enabled devices for reception of the message.

14. The method according to claim 1, wherein the report further comprises an indication of the at least one direction lacking other vehicle-to-vehicle communication enabled devices for reception of the message.

15. An arrangement for a vehicle-to-vehicle communication enabled device adapted to operate in accordance with a vehicle-to-vehicle communication protocol, and in accordance with a cellular communication protocol for communication with a wireless communication network, the arrangement comprising:
  a positioning unit adapted to determine a geographical position of the vehicle-to-vehicle communication enabled device;
  a direction evaluator adapted to determine, based on the determined geographical position, whether at least one direction extending from the determined geographical position lacks other vehicle-to-vehicle communication enabled devices for reception of the message; and
  a transmitter adapted to—if at least one direction lacks other vehicle-to-vehicle communication enabled devices for reception of the message—transmit a report to a network node of the wireless communication network, wherein the report indicates the message.

16. The arrangement of claim 15 further comprising a determiner adapted to determine one or more directions for transmission of the message by the vehicle-to-vehicle communication enabled device, and wherein the direction evaluator is adapted to determine whether at least one direction among the determined one or more directions lacks other vehicle-to-vehicle communication enabled devices for reception of the message.

17. The arrangement of claim 16 wherein the determiner is adapted to determine the one or more directions for transmission of the message by:
  correlating the determined geographical position with map information; and
  determining each of the one or more directions for transmission of the message as a direction that, according to the map information, comprises a road connection crossing the determined geographical position.

18. The arrangement of claim 15 further comprising a determiner adapted to determine, for each of the at least one direction lacking other vehicle-to-vehicle communication enabled devices for reception of the message, whether the direction is a direction for transmission of the message by the vehicle-to-vehicle communication enabled device.

19. The arrangement of claim 18 wherein the determiner is adapted to determine whether the direction is a direction for transmission of the message by:
  correlating the direction with map information; and
  determining that the direction is a direction for transmission of the message if, according to the map information, the direction comprises a road connection crossing the determined geographical position.

20. The arrangement of claim 15 further comprising a receiver adapted to monitor and receive signaling comprising respective geographical positions of one or more other vehicle-to-vehicle communication enabled devices; and
  wherein the direction evaluator is adapted to further base the determination whether at least one direction lacks other vehicle-to-vehicle communication enabled devices for reception of the message on the monitored signaling.

21. The arrangement of claim 20 wherein the direction evaluator is adapted to further base the determination whether at least one direction lacks other vehicle-to-vehicle communication enabled devices for reception of the message on the received geographical positions.

22. The arrangement of claim 21 wherein the direction evaluator is adapted to determine that a direction lacks other vehicle-to-vehicle communication enabled devices for reception of the message if there are no received geographical positions in that direction extending from the determined geographical position.

23. The arrangement of claim 21 wherein the direction evaluator is adapted to determine whether the at least one direction lacks other vehicle-to-vehicle communication enabled devices for reception of the message by:
  correlating the determined and received geographical positions with map information; and
  determining that a direction lacks other vehicle-to-vehicle communication enabled devices for reception of the message if that direction does not comprise at least one of the received geographical positions which, according to the map information, is on a road connection crossing the determined geographical position.

24. The arrangement of claim 15, wherein the transmitter is further adapted to transmit the message using vehicle-to-vehicle communication.

* * * * *